United States Patent [19]
Brock et al.

[11] Patent Number: 5,555,252
[45] Date of Patent: Sep. 10, 1996

[54] MAGNETIC RECORD/REPRODUCE MODULE FOR CAMERA

[75] Inventors: George W. Brock, La Jolla; Robert E. Swanson, Del Mar, both of Calif.

[73] Assignee: Eastman Kodak Company, Rochester, N.Y.

[21] Appl. No.: 345,961

[22] Filed: Nov. 28, 1994

[51] Int. Cl.$^6$ ................................................ C03B 17/24
[52] U.S. Cl. ............................................................ 354/106
[58] Field of Search ................................. 354/105, 106, 354/109, 288, 75, 76

[56] References Cited

U.S. PATENT DOCUMENTS

| | | | |
|---|---|---|---|
| 2,773,416 | 12/1956 | Kleinerman | 360/3 |
| 3,029,684 | 4/1962 | Wilkins et al. | 360/3 |
| 4,179,197 | 12/1979 | Suzuki et al. | 352/14 |
| 4,270,853 | 6/1981 | Hatada et al. | 354/76 |
| 4,435,061 | 3/1984 | Fukahori et al. | 354/173.11 |
| 4,449,805 | 5/1984 | Sakurada et al. | 354/105 |
| 4,470,677 | 9/1984 | Tsujimoto et al. | 354/106 |
| 4,642,717 | 2/1987 | Matsuda et al. | 360/105 |
| 4,702,580 | 10/1987 | Denner | 354/106 |
| 4,933,780 | 6/1990 | Wash et al. | 360/1 |
| 4,956,661 | 9/1990 | Taniguchi et al. | 354/412 |
| 4,977,419 | 12/1990 | Wash et al. | 354/76 |
| 5,040,068 | 8/1991 | Parulski et al. | 358/209 |
| 5,220,368 | 6/1993 | Kikukawa et al. | 354/106 |
| 5,231,438 | 7/1993 | Smart | 354/281 |
| 5,245,372 | 9/1993 | Aoshima | 354/106 |
| 5,276,472 | 1/1992 | Bell et al. | 354/76 |
| 5,387,955 | 2/1995 | Cocca | 354/76 |

FOREIGN PATENT DOCUMENTS

| | | | |
|---|---|---|---|
| 3809148 | 9/1989 | Germany | G03B 29/00 |

*Primary Examiner*—Michael L. Gellner
*Assistant Examiner*—Nicholas T. Tuccillo
*Attorney, Agent, or Firm*—Roger A. Fields; Joseph F. Breimayer

[57] ABSTRACT

Magnetic record/reproduce apparatus for recording or reproducing information on a magnetic layer of a filmstrip in a camera, and more particularly, modular magnetic recording apparatus for optional attachment to photographic still cameras. Power and control signals supplied from within the module define the format and content of information recorded or reproduced from tracks in a substantially transparent magnetic layer. In one embodiment, the camera contains a record/reproduce head in the film transport path. In a further embodiment, the module contains the record/reproduce head, and the camera is adapted to receive the record/reproduced head in a record/reproduced aperture and position it in the film transport path on attachment of the module to the camera housing. In both embodiments, the magnetic head is preferably an elongated multi-head element array. Preferably the magnetic head aperture of the second embodiment is shaped to receive the elongated multi-head array as either a single elongated opening or a row of individual head receiving openings aligned in the cross-film direction, and a light tight flexible, opaque membrane is stretched over the magnetic head aperature so that the multi-head array may be inserted therein and physically bear against the membrane and the magnetic layer of the film strip adjacent to the membrane. A further external movable door or cover may be provided over the magnetic head aperture that is movable out of the way when the module attachment to the camera is made.

17 Claims, 7 Drawing Sheets

MAGNETIC RECORD/REPRODUCE MODULE FOR CAMERA

CROSS-REFERENCE TO RELATED APPLICATIONS

Reference is hereby made to commonly assigned, copending U.S. patent application Ser. No. 08/333,532 filed Nov. 2, 1994, by W. Stanley Czarnecki et al. entitled MAGNETICS-ON-FILM HEAD ARRAY FOR CAMERA; and Ser. No. 08/298,101 filed Aug. 30, 1994, entitled CAMERA ON-BOARD VOICE RECOGNITION by Dale W. Mcintyre et al.

FIELD OF THE INVENTION

This invention relates to magnetic record/reproduce apparatus for recording information on magnetic layers of a filmstrip in a camera, and more particularly, to modular magnetic recording apparatus for selective attachment to photographic still cameras.

BACKGROUND OF THE INVENTION

In commonly assigned U.S. Pat. No. 4,977,419, there is disclosed a photographic film having a virtually transparent magnetic layer covering the non-emulsion side of the film and dedicated recording areas or tracks on the layer for recording information such as film type, film speed, film exposure information and information relevant to the processing and subsequent use (e.g., printing) of the exposed image frames. The disclosed system provides for recording of information during film manufacture, reading and/or recording of information during camera use, and reading and/or recording of print related information during photofinishing using the magnetics-on-film (MOF) layer.

The information may include voiced messages or sound associated with the photographed scene and may be recorded in digital or analog format as described in a further commonly assigned U.S. Pat. No. 5,276,472. In the '472 patent, a system is described for recording and playing back voiced messages prior to recording edited messages on certain of the MOF tracks related to each film image frame. The messages are encoded on the prints made by the photofinisher for aural reproduction using a hand held scanner. The speaker/microphone and audio circuits are included in the camera.

It has also been proposed to include a keyboard on a camera back to input data for recording in memory modules or the like associated with the film cartridge or on the film strip for use in photofinishing operations and to print messages on the prints and large LCD panel for displaying the keyed-in information before it is recorded.

Referring now to FIG. 1, the MOF layers on a film strip 10 in which such information may be recorded and from which pre-recorded information may be read out are depicted. The magnetically coated color negative 35 mm film strip 10 includes a base 11, various well-known photochemical layers 13 on one side of the base 11 and a virtually transparent magnetic layer 15 on the other side. An antistatic and lubricating layer 17 overlies the magnetic layer 15. The film strip 10 includes perforations 19 along the film edge at regular intervals matching the pitch of a metering pawl in a camera adapted to use the film strip 10.

For purposes of recording data in the magnetic layer 15, each frame of the film strip 10 may be formatted as shown in FIG. 1 (as more fully described in the '419 patent, the disclosure of which is incorporated herein by reference). The frame area is divided into a plurality of predetermined longitudinal track locations designated in the drawing as outermost tracks C0–C3 and innermost tracks F00–F29. As described more fully in the '419 patent, certain of the tracks may be reserved for recording of information in the camera using magnetic recording means included in the camera. In addition, other tracks may be reserved for use by the photofinisher. Additionally, the '472 patent indicates that certain of the tracks may be used for recording of audio information.

In order to accommodate the presence of the camera tracks C0 through C3 along the film strip edges, the perforations 19 are excluded for periodic imperforate edge regions 10a adjacent each exposed frame and are restricted to intermediate regions 10b lying between successive frames. In the embodiment of FIG. 1, there is only one perforation 19 in each intermediate region 10b along only one longitudinal edge of the film strip 10.

Reading and recording information on such tracks of a magnetic coating or stripes on photographic film strip 10 in a still camera require solutions to problems different than those encountered in other apparatus. The space limitations in a portable hand held still camera, which necessarily must be as compact and light as possible to appeal to the average consumer, restrain the size and location of the magnetic record/reproduce head and the film drive system. The space provided in the camera body is difficult to find to position the magnetic head in compliance with the MOF layer and to contain the associated record/reproduce circuits for voice recording, keyboard input and other information input and processing components, and the additional battery.

In addition, the head-to-film recording and reading interface and the transport mechanism differs in major ways than that normally associated with digital magnetic tape drives or even disk drives as described generally in commonly assigned U.S. Pat. No. 4,933,780 and in the above-referenced Ser. No. 08/335,532 application. In the '780 patent, an approach is taken wherein the magnetic record/reproduce head is flexibly mounted within the camera body and positioned with respect to the chamber for receiving a modified film cartridge. The head bears against the MOF layer of the film strip exposed through an opening in the film cartridge lip. The film is supported and flattened within the lip, and the emulsion side bears against a compliant support formed with a light blocking plush material overlying a lower flange of the cartridge lip.

In the '419 patent and the Ser. No. 08/333,532 application, the magnetic head is shown extending through an aperture in the platen into contact with the MOF layer of the film strip advanced past the exposure gate from a supply cartridge to a take-up spool. In all of these cases, the record/reproduce circuits, and the battery are located within the camera.

Problems to be Solved by the Invention

Camera purchasers seek economical, compact cameras that contain a wide range of features adding convenience and providing quality photographic prints and transparencies. The above described developments in recording information related to the scenes or events photographed add convenience but also add expense and bulk to the camera body when all of the components are included in the camera. Moreover, the selection of the record/reproduce format as well as the number and variety of features must be preselected, fixed into hardware and operating software, and built into the camera. This may unnecessarily decrease the flexibility of use or appeal of the camera to potential users while increasing its size and cost.

SUMMARY OF THE INVENTION

It is therefor a primary object of the invention to enhance the capabilities of a camera to optionally record or reproduce information, particularly on the MOF layers of the film strip, with an additional record/reproduce module attached to the camera or to use the camera conventionally without the record/reproduce module and capability.

It is a further object of the present invention to provide a record/reproduce module for attachment to a camera to provide magnetic record/reproduce capabilities powered by a power supply in the module rather than in the camera.

It is a still further object of the present invention to provide a record/reproduce module for attachment to a camera to provide magnetic record/reproduce capabilities to maintain the simplicity and small size of the camera when used without the record/reproduce module.

It is yet a further object of the present invention to provide a record/reproduce module for attachment to a camera to provide magnetic record/reproduce capabilities to provide for recording and reproducing information of differing types and in differing formats depending on the capabilities of the module while maintaining a universal use for the camera when used without the record/reproduce module.

These and other objects of the invention are realized in a system comprising a still camera for receiving an elongated film strip having a substantially transparent magnetic layer deposited on the film surface and an optional module for attachment to the camera to record/reproduce information in the magnetic layer in relation to the exposure of image frames of the film strip employing power and control signals supplied from within the module defining the recording format and information content.

In a first embodiment, the system comprises:

in the camera, means for guiding the film strip advanced in a film transport path in a film plane from a film strip supply to a film strip takeup and through an exposure gate for exposing image frames in the photosensitive layers of the film strip and past a magnetic head aligned with said guiding means for contacting the magnetic layer on the film strip for record/reproduce information, means for advancing the film strip between exposures of film strip image frames and exposure control means responsive to user input signals for initiating and controlling the exposures of image frames, camera input/output terminal means coupled to the magnetic head for transmitting recording signals to the magnetic head and coupled to the film strip advancing means and the exposure control means for providing film advance and exposure control signals, and module attaching means for accepting attachment of the module with the camera body: and in the record/reproduce module, module input/output terminals for making mating contact with the camera input/output terminals, record means coupled to the module input/output terminals for establishing the record format and providing record signals to the magnetic head during record time intervals, and synchronizing means for synchronizing the record time intervals to the film advance control signals provided to the record means.

In a second embodiment, the system comprises:

in the camera, a camera body defining an outer light tight enclosure, means for guiding the film strip advanced in a film transport path in a film plane from a film strip supply to a film strip takeup and through an exposure gate for exposing image frames in the photosensitive layers of the film strip and past a magnetic head aperture in said outer enclosure aligned with said guiding means and the magnetic layer on the film strip, the magnetic head aperture including a light tight cover over the magnetic head aperture, means for advancing the film strip between exposures of film strip image frames and exposure control means responsive to user input signals for initiating and controlling the exposures of image frames, camera input/output terminal means coupled to the magnetic head for transmitting recording signals to the magnetic head and coupled to the film strip advancing means and the exposure control means for providing film advance and exposure control signals, module attaching means for accepting attachment of the module with the camera body: and in the record/reproduce module, module input/output terminals for making mating contact with the camera input/output terminals, a magnetic head, record means coupled to the module input/output terminals for establishing the record format and providing record signals to and receiving reproduce signals from the magnetic head during record time intervals, synchronizing means for synchronizing the record time intervals to the film advance control signals provided by the film strip advancing means to the record means, and camera attaching means for attaching the module in position with the module attaching means for coupling the camera and module input/output means together and aligning said magnetic head within said magnetic head receiving aperture.

In both embodiments, the magnetic head is preferably a magnetic recording head but may be a magnetic recording and reproducing head and may for convenience be referred to in either case as a magnetic record/reproduce head or a magnetic recording head or simply as a magnetic head. Preferably the magnetic record/reproduce head is an elongated multi-head of the type disclosed in the above-referenced Ser. No. 08/333,532 application for recording and/or reproducing information from the tracks of the MOF layer in the format disclosed in the above referenced '472 patent in either analog or digital form. The information and content format may preferably be defined by the record means incorporated into the module.

Preferably the magnetic head aperture of the second embodiment is shaped to receive the elongated multi-head array as either a single elongated opening or a row of individual head receiving openings aligned in the cross film direction and the light tight cover further comprises a thin flexible, opaque membrane over the magnetic head aperture so that the multi-head array may be inserted therein and physically bear against the membrane and the magnetic layer of the film strip adjacent to the membrane. Optionally, a further external movable door or cover may be provided over the magnetic head aperture that is movable out of the way when the module attachment to the camera is made.

Advantages of the Invention

In accordance with the present invention, a universal camera may be provided to be used for either conventional photography without recording capabilities or to be used with a record module for recording (and optionally reproducing) information in the MOF layer of a photographic film strip. The camera need only have additional input/output terminals and either an internal magnetic record head or a record head aperture for receiving a record head of the record module. The camera can be made less expensive and smaller and also be used for a variety of purposes. The record modules can be tailored with particular hardware and software to record in different formats and different content. Therefore a purchaser can enhance the recording (and reproducing) capabilities desired by acquiring selected record modules.

BRIEF DESCRIPTION OF THE DRAWINGS

These and other objects, advantages and features of the present invention will be more readily understood from the following detailed description of the preferred embodiments thereof, when considered in conjunction with the drawings, in which like reference numerals indicate identical or similar components throughout the several views, and wherein.

DETAILED DESCRIPTION OF THE PREFERRED EMBODIMENTS

Figure 1:
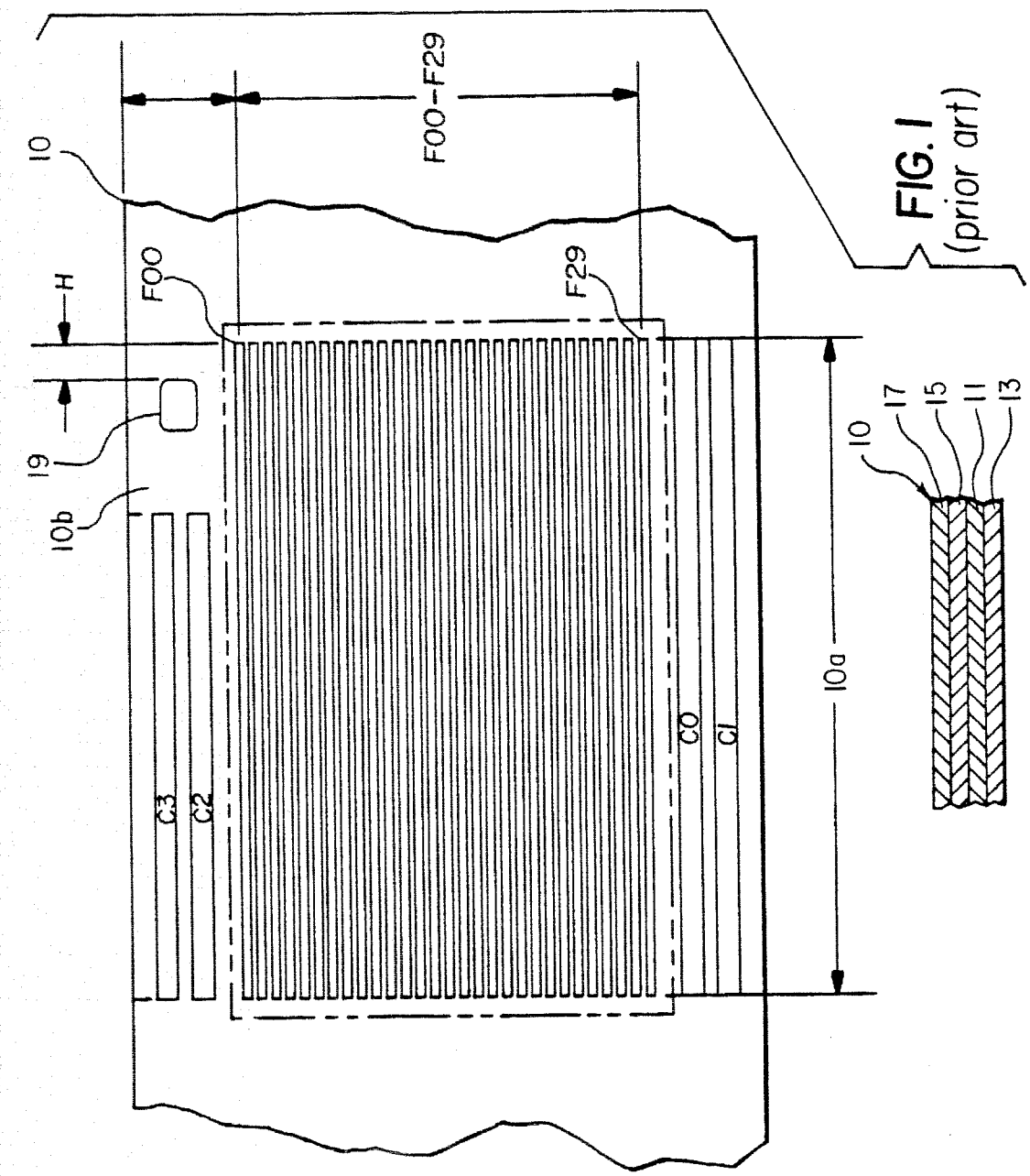
FIG. 1 is a diagram illustrating the parallel dedicated tracks in a virtually transparent MOF layer in a preferred format of the prior art especially for use in cameras having a magnetic film read/write capability.
Figure 2:
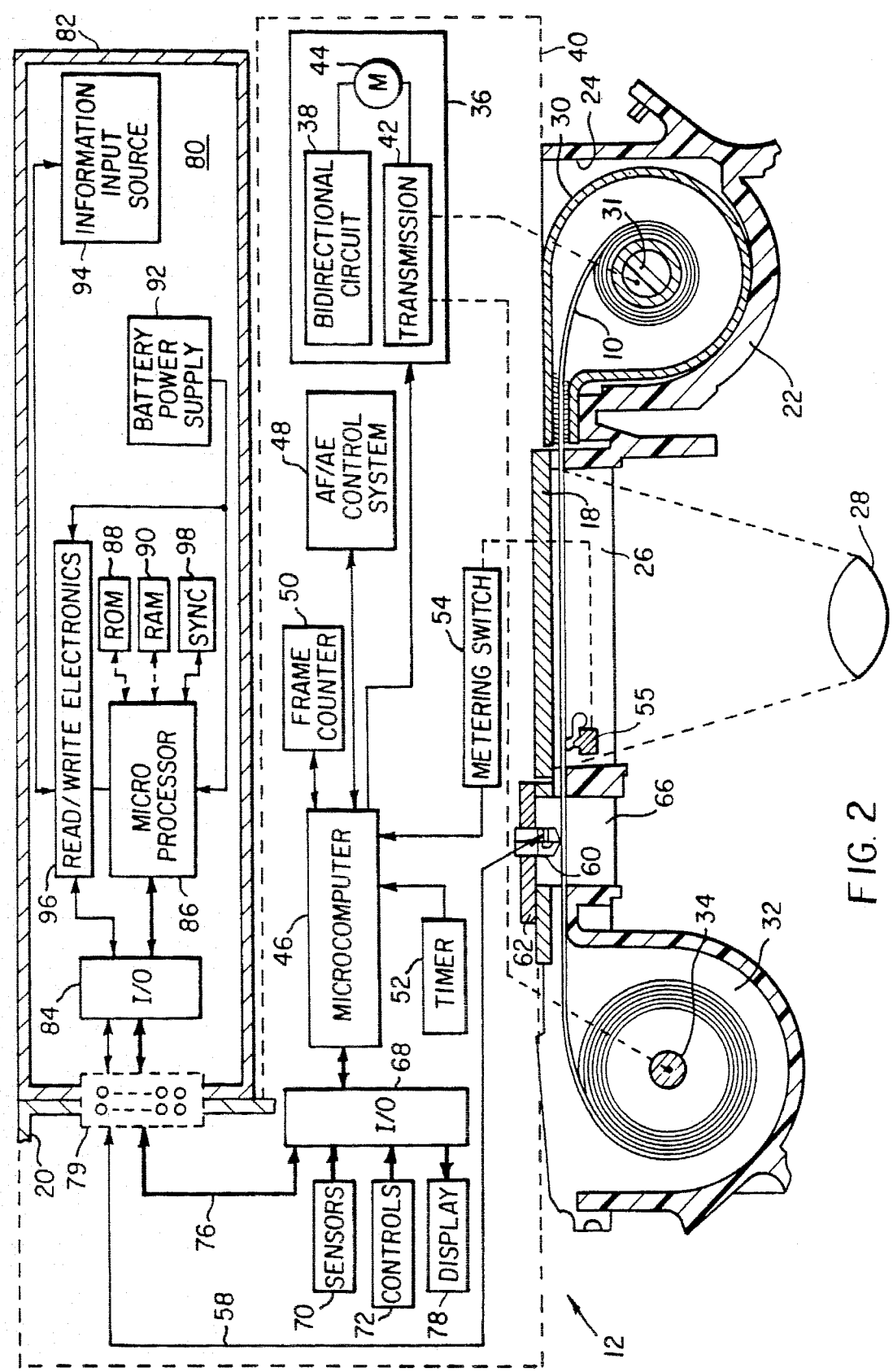
FIG. 2 is simplified schematic diagram of the film strip handling and electro-mechanical control system of a camera having a magnetic record/reproduce head mounted therein together with the components of a record/reproduce module for operating the record/reproduce head when attached to the camera.

Referring to FIG. 2, there is shown the motorized film strip advance and rewind components of a typical photographic still camera 12, similar to that disclosed in the '780 patent, in which the present invention may be implemented, in a first embodiment, employing the filmstrip 10 of FIG. 1. FIG. 2 schematically illustrates any such camera 12, and features not necessary for an understanding of the present invention have been omitted or shown in block diagram to simplify the disclosure.

The schematically illustrated section of camera 12 comprises a frame or housing 22 having a cartridge loading chamber 24 at one end thereof for receiving a film cartridge 30. A pair of film rails (not shown) are formed on opposite sides of the rectangular exposure opening 26 to engage the longitudinal edges of the film strip 10. The film strip 10 is urged toward the rails by a backing plate 18 mounted on a leaf spring on the camera back. The backing plate 18 comprises a flat rectangular plate having planar dimensions complimentary with the rectangular exposure opening 26 and engages the filmstrip 10 and urge it with slight pressure toward the rails under the influence of the leaf spring.

The cartridge 30 as depicted may take the form of a conventional 35 mm cartridge having a passive light lock through which the filmstrip 10 is withdrawn an image frame at a time for exposure and rewound after exposures are complete. The film cartridge may also take the form of a "thrust" style cartridge of the type disclosed in commonly assigned, U.S. Pat. No. 5,231,438 having an active light lock door through which the film strip 10 is advanced for exposure and rewound after all image frames are exposed. In either case, preferably the film cartridge 30 is end loaded into the chamber 24 through a door or the like in the top or end of the camera as shown, for example, in the '438 patent, such that the camera back is not opened, and the cartridge 30 is fixedly held in the orientation shown in FIG. 2. The present invention may be practiced with any camera and cartridge interface configuration and features, and further description is deemed unnecessary.

From the cartridge 30, the filmstrip 10 is transported in a film transport path across a rectangular exposure gate opening 26 aligned with a camera taking lens 28, shutter and aperture etc., to a film take-up chamber 32 where it is wound on the take-up spool 34. In this transport process, the electro-mechanical filmstrip advance/rewind system 36 operates to advance the filmstrip 10 an image frame at a time from the cartridge 30 to the take-up spool 34 after each image frame exposure under the control of the camera microcomputer 46. The advance/rewind motor 44 is driven by bi-directional circuit 38 which is coupled through transmission 42 to the film cartridge hub 31 and the takeup spool 34 to rotate them in the advance direction.

All camera operations in advancing and rewinding the filmstrip and controlling the exposure of image frames, electronic flash illumination and the like are controlled by an electronic control system 40 which responds to conventional sensor inputs 70 and camera controls 72. The electronic control system 40 is provided with a pre-programmed microcomputer 46 coupled with an auto focus/auto exposure control and shutter system 48, frame counter 50, timer 52, metering switch 54 and LCD display 78. Other conventional elements of the camera 12 that are not specifically depicted include a shutter release mechanism, a real time and date clock and other well known camera features. These components are all controlled from the electronic control system 40 by microprocessor 46 in a manner well known in the art of still cameras, and since they form no part of the present invention, further description is deemed unnecessary.

In accordance with the present invention, the camera 12 of FIG. 2 is constructed to operate as a conventional still camera with conventional film or to operate with the MOF read/write capabilities afforded by the filmstrip 10 when a record/playback module 80 is optionally attached to the camera housing 20 by the user. The camera 12 and the record/playback module 80 are preferably provided with mating attachment mechanisms and electrical connectors to secure the module housing 82 to the camera housing 22 and to make electrical connections with the microcomputer 46 through a data and control interface described in detail below.

FIG. 2 depicts the first embodiment of the invention, wherein the camera 12 is modified to include a permanently installed magnetic record/reproduce head 60 supported on a mounting plate 62 to extend into the mounting cavity 66 that is electrically connected through signal lines 58 to a terminal connector block 74. The record/reproduce head 60 is preferably of the type described in the above incorporated '780 or '419 patents or the multi-head array described in the above referenced Ser. No. 08/333,532 application (incorporated herein by reference). In the latter case, the multi-head array of discrete magnetic record/reproduce head elements is shaped and contoured to comply with the cross-film curvature of the filmstrip 10 across the head mounting cavity 66. When so positioned, reading and writing information from certain or all of the tracks C0–C3 and F00–F29 of FIG. 1 may be accomplished.

The terminal connector block 74 includes a plurality of mating terminal pins and pads or sockets mounted respectively in the module housing 82 and the camera housing 22 to be attached together as schematically shown in FIG. 2. The microcomputer 46 is also coupled with the terminal connector block 74 through I/O ports 68 and data and control bus 76. Certain synchronization signals derived from the metering switch 54 attached to sprocket hole sensor 55, timer 52, and the control signals for the filmstrip advance/rewind system 36 are generated by the microcomputer 46 and applied on bus 76 to the terminal connector block 74.

The record/reproduce module 80 includes I/O ports 84 coupled to the terminal connector block 74 which transfers timing signals from microcomputer 46 to microprocessor 86. The microprocessor is coupled with ROM 88 and RAM 90, battery power supply 92 and synchronization circuit 98. The microprocessor 86 controls magnetic data recording or playback by the head 60 through head read/write electronics 96 in synchronization with operations of the control system 40, particularly the advancement of the filmstrip 10 past the magnetic record/reproduce head 60.

The microprocessor 96 may accept information to be magnetically recorded on the filmstrip 10 from a variety of sources both within the module 80 and the camera 12. The record/reproduce module 80 may be designed to have a specific information source 94 for recording information or data of different types and formats. Depending on the complexity and features of the particular module 80, the information source 94 may include a display panel, audio sound recording and playback components, a keyboard, and/or other data interfaces.

Typically, the camera user may input through the information input source 94 instructions as to the number of prints desired for a given image frame, by frame number, for example, the name and address of the camera user for ultimate use by the photofinisher, or a title of the scene or event being photographed. The information may be inputted audibly in the manner disclosed in the '472 patent or manually by a keyboard or preloaded into the microprocessor 86 and RAM 90 through a computer interface, for example. In this regard, record/reproduce modules may be preloaded with information and instructions performing for specific tasks, e.g. recording scientific data in conjunction with a certain defined use of the camera 12. It is also contemplated that the information input source 94 may be configured in any of the embodiments of the commonly assigned, co-pending Ser. No. 08/298,101 application to receive vocabularies providing enhanced voice recognition capabilities.

The microprocessor 86 may also accept camera operation and scene related information from the AF/AE control system 48 and sensors 70 through microcomputer 46 to be magnetically recorded on the film strip 10 for ultimate use by the photofinisher. Such information may include the camera identification, date, camera orientation, scene luminance, shutter speed, use of artificial illumination and other scene and equipment related data for each image frame exposure.

Moreover, upon attachment of the record/reproduce module 80 to the camera 12, the attachment and performance of the operating systems may be initialized and a display of the camera may indicate to the user that all systems are enabled or if an error condition exists. Then, after loading and during advancement of the filmstrip 10 across the record/reproduce head 60, the pre-recorded information on certain of the filmstrip MOF layer tracks, e.g. film type, speed and date of manufacture may be read out and stored temporarily in RAM 88. Then, the data may be relayed to the microcomputer 46 for use in setting camera operating conditions. The reproduce operation would be synchronized by microcomputer 46 instructing microcomputer 86 and sync register 98 to enable read/write electronics 96 to read just prior to enabling filmstrip advancement by advance/rewind system 36. After filmstrip advance is halted, the data may be transferred to the internal RAM of microcomputer 46 for use in setting exposure conditions. The age of the filmstrip may be calculated and employed with the image frame number to make compensation for core set film curl, depending on the type of film base. Other uses of read out filmstrip data will be apparent to those of skill in the art.

Although not specifically illustrated, it will be understood that in a further variation, the camera control system 40 may include separate read electronics controlled by microcomputer 46, so that the pre-recorded filmstrip data may be read and employed as described above without the user having to attach module 80. In this variation, the principal use of the module 80 would be to record information as described above.

Figure 3:
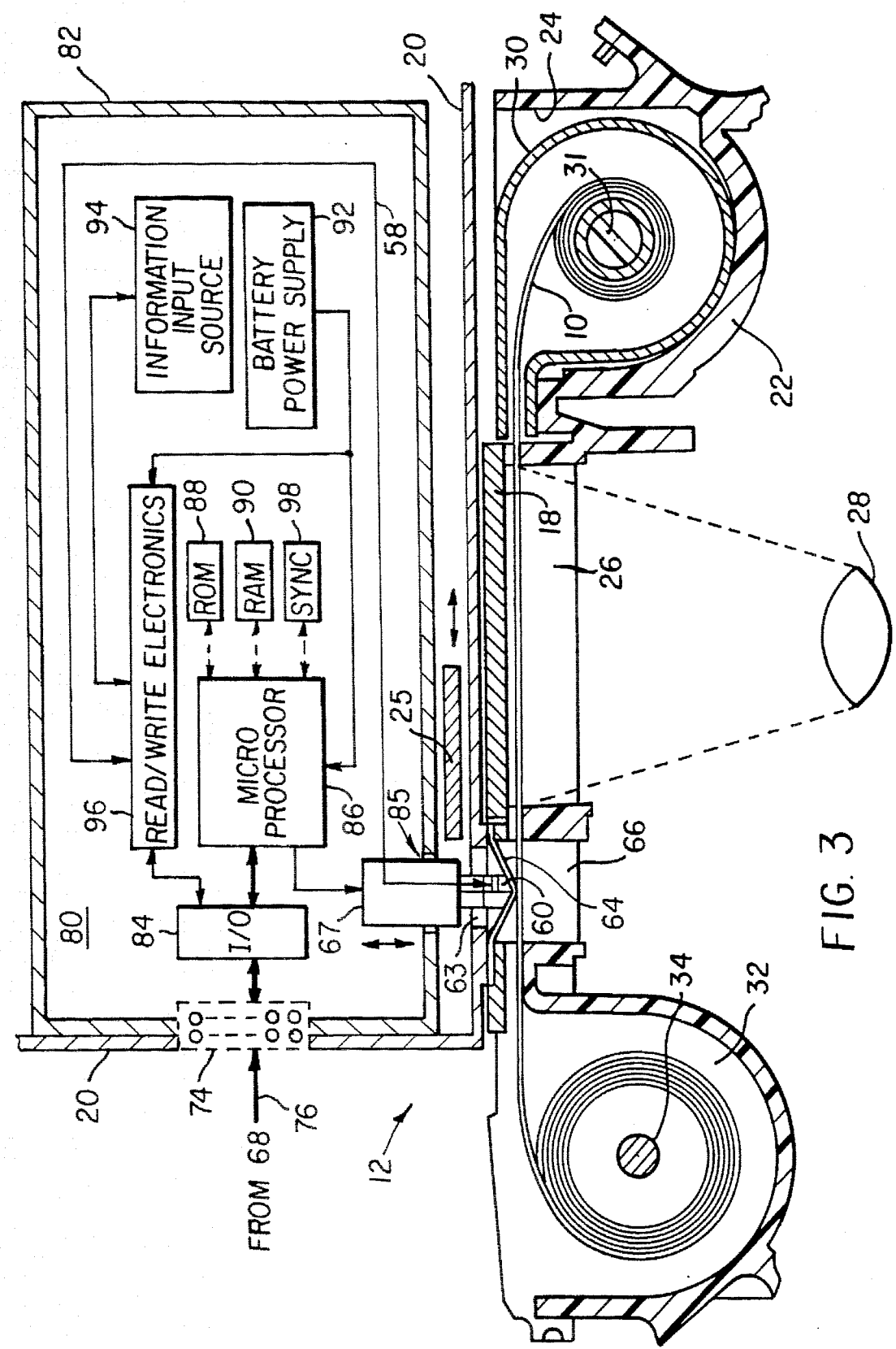
FIG. 3 is a simplified schematic diagram of the system of FIG. 2 modified by having the magnetic record/reproduce head in the record/reproduce module.

Referring now to FIG. 3, a schematic view of the components of the second principal embodiment of the invention, wherein the record/reproduce head 60 is in the module 80, are depicted. The camera electro-mechanical control system 40 and associated components shown in FIG. 2 are not depicted for clarity and will be understood to be incorporated into camera 12 in the embodiment of FIG. 3. The camera I/O bus 76 for transferring data and control signals between the camera operating system 40 and the record/reproduce module 80 is depicted leading to the terminal connector block 74 at the attachment point of the camera housing 20 and the module housing 82. As in FIG. 2, the interconnection of the housings 20 and 82 is depicted schematically to accommodate the depiction of all the illustrated components.

In this embodiment, the camera body 20 is modified to accept the module 80 with the magnetic head 60 in the module 80, rather than in the camera 12. The camera 12 transports the film strip 10 between the film cartridge 30 and the take-up chamber 32 as described above. The back of the camera housing 20 extends over the backing plate 18 and the mounting cavity 66. The mounting cavity 66 is aligned with the camera housing opening 63, and a flexible opaque web 64 is mounted to cover the opening 63 and prevent light from entering the mounting cavity 66. With the record/reproduce module 80 removed, the opaque web 64 may be corrugated and extends in a relatively flat plane across the camera housing opening 63. Although not specifically shown in FIG. 3, it will be understood that the opening 63 and web 64 may be elongated across the width of the filmstrip 10, or an array of smaller discrete openings 63 and webs 64 may extend across the width of filmstrip 10, to accommodate the linear multi-head array of discrete magnetic record/reproduce heads referenced above. It will also be understood that a protective, slidable protective door 25 may normally cover the opening(s) 63 and web(s) 64, and that the attachment of the record/reproduce module 80 to the camera housing 20 is accompanied by opening the protective door 25 to the position depicted in FIG. 3.

As shown in FIG. 3, the record/reproduce module 80 is attached to the camera housing 20 which may be effected by a detachable connector of any type that also opens the protective door 25 and aligns the module housing opening 85 with the camera housing opening 63. The record/reproduce module 80 includes the magnetic record/reproduce head 60 attached to a head advance/retraction drive plunger mechanism 67 that normally maintains the record/reproduce head 60 within the module housing 82. The plunger mechanism 67 is actuated by the microprocessor 86 after the filmstrip 10 is advanced into the takeup chamber 34 to advance the record/reproduce head 60 through the openings 63 and 85 and against the flexible opaque web 64 into the position depicted in FIG. 3. Alternatively, the plunger mechanism 67 may be mechanically advanced by manual force applied by the user during attachment of the module 80 and retracted either electrically or manually before the module 80 is to be detached from the camera housing 20. Reading and writing of information from and to the tracks of the filmstrip MOF layer during use of the camera 12 then takes place through the flexible opaque web 64 as described above.

Preferably, a locking attachment is made of the record/reproduce module 80 to the camera housing 20 in the embodiment of FIG. 3 before the record/reproduce head 60 can be advanced. Before the user can remove the record/reproduce module 80, a specific command must be provided through the information input source 94 to retract the head 60 and then release the interlock.

Figure 4:
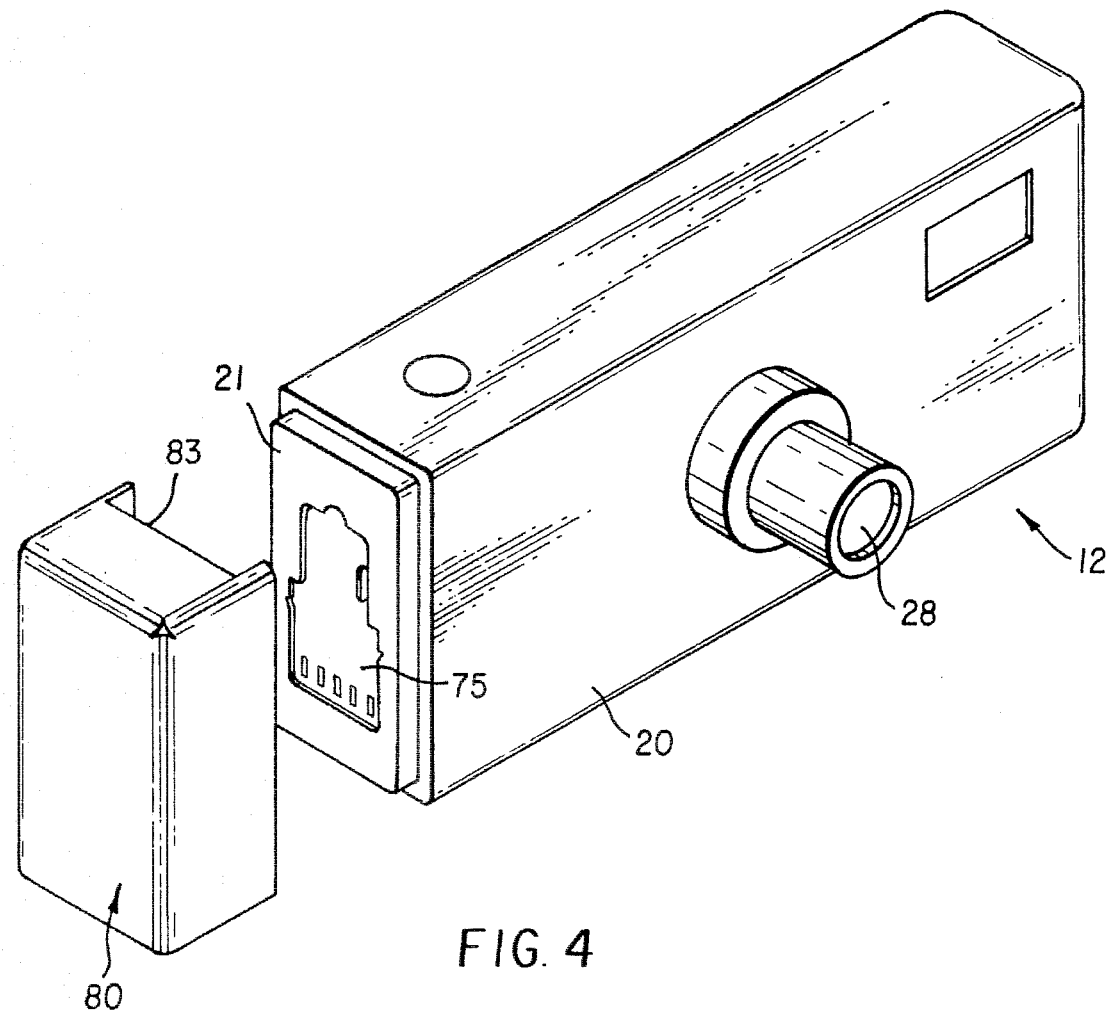
FIGS. 4 and 5 are perspective views illustrating one manner of attaching the magnetic record/reproduce module to the camera body of FIG. 2.
Figure 5:
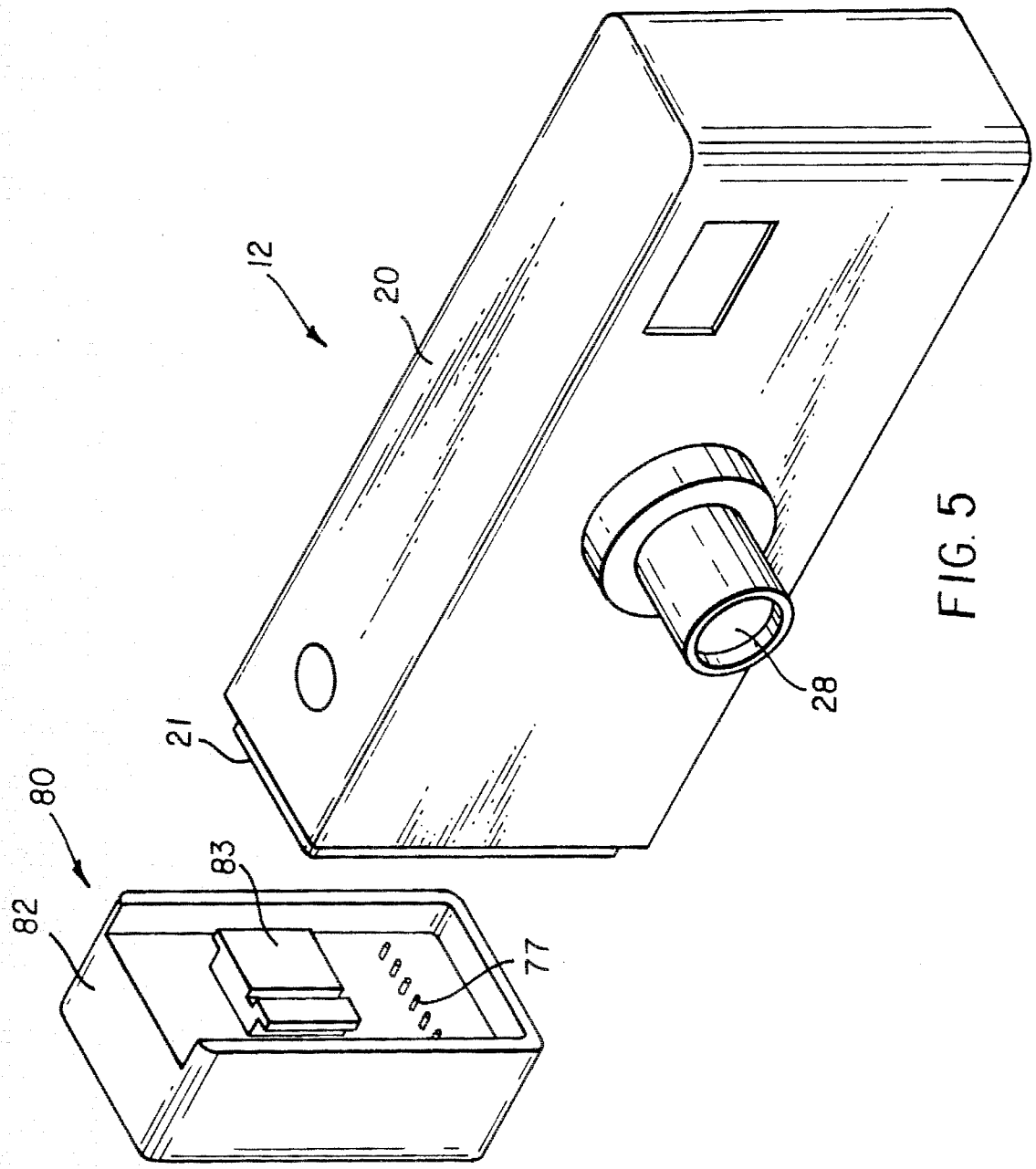

Turning now to FIGS. 4 and 5, they depict perspective views illustrating one manner of attaching the magnetic record/reproduce module 80 to the camera housing 20 in the embodiment of FIG. 2. The camera housing 20 includes a slide-on connector 21 at the shaped end thereof and an array of terminal pads 75 of the connector terminal block 74 as shown in FIG. 4. The mating module connector 83 end, together with the spring loaded connector pins 77 that contact the camera body pads 75 on attachment, are depicted in FIG. 5. The spring loaded terminal pins retract into the module housing 82 as the mating module connector 83 slides onto the slide-on connector 21 of the camera housing 20. The attachment is similar to that employed in attaching flash illumination attachments to camera bodies, e.g. that used in the "Tele Extra 2" 110 film format camera. Alternatively, the terminal pins 77 may be advanced from a retracted position during the attachment and then mechanically or electrically advanced against the terminal pads 75 or into mating female pin receptacles. FIGS. 4 and 5 are illustrative of one of many possible ways of making the attachment of the camera 12 and module 80 that will be apparent to those of skill in the art.

Figure 6:
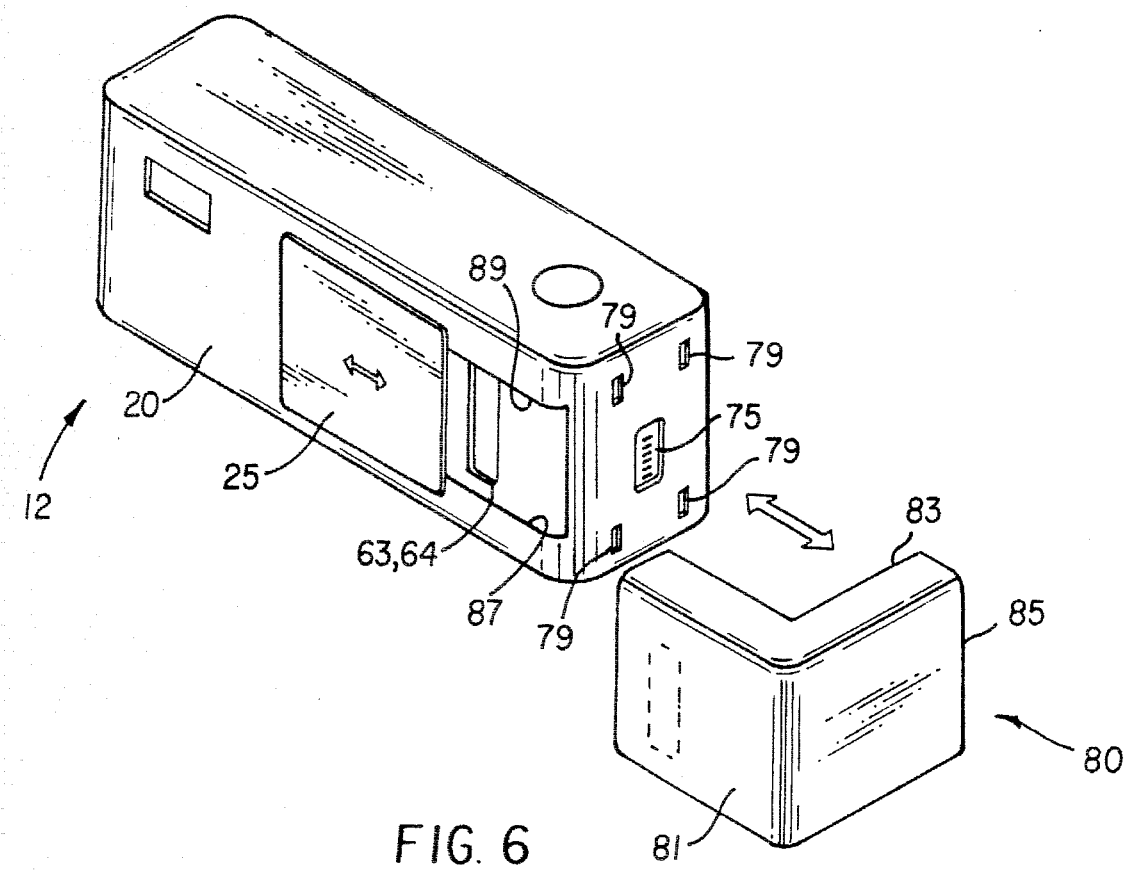
FIG. 6 is a perspective view of the rear of a camera and a record/reproduce module depicting an elongated camera housing opening covered by an opaque web for receiving an array of magnetic record/reproduce heads of the record/reproduce module of FIG. 3.
Figure 7:
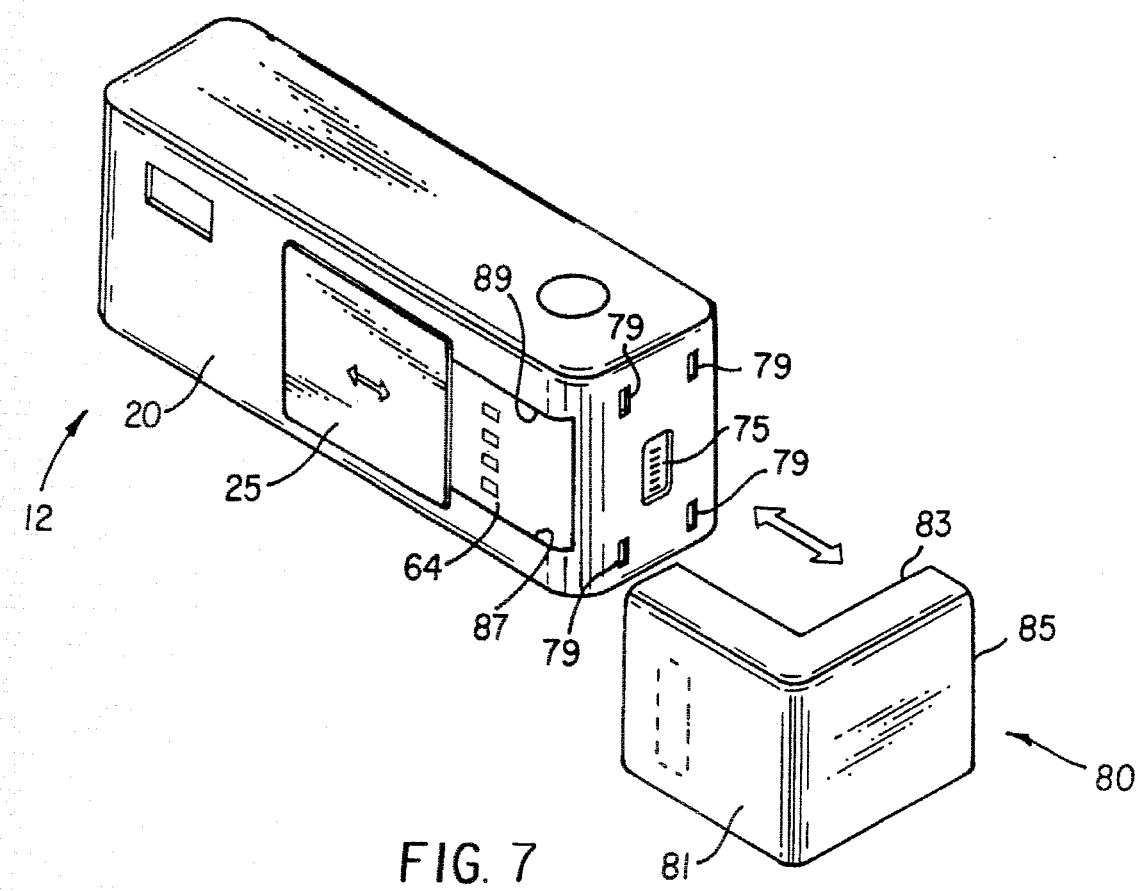
FIG. 7 is a perspective view of the rear of a camera and a record/reproduce module depicting a linear array of camera housing opening covered by an opaque web for receiving an array of magnetic record/reproduce heads of the record/reproduce module of FIG. 3.

FIGS. 6 and 7 depict possible configurations of the camera housing 20 and record/reproduce module 80 of the embodiment of FIG. 3 FIG. 6 is a perspective view of the rear of the camera housing 20 depicting the elongated camera housing opening 63 covered by the opaque web 64 for receiving the entire array of discrete head elements of magnetic record/reproduce head 60 of the record/reproduce module 80. FIG. 7 is a perspective view of the rear of the camera housing 20 depicting a linear array 65 of camera housing openings each covered by the opaque web 64 also for receiving the array of discrete head elements of magnetic record/reproduce head 60 of the record/reproduce module 80. The normally closed protective door 25 is shown retracted in these figures from its normally closed position overlying the opaque web 64 and the elongated opening 63 or array 65 of spaced openings.

The module 80 of FIGS. 6 and 7 contains the electronic components described above in reference to FIG. 3 and is L-shaped, formed with an end section 81 and a back section 85. The module 80 is attached by slidable engagement of dovetail guides (not shown) on the interior side of back section 85 with mating dovetail slide guides 87, 89 extending along the back of the camera housing 20. During the attachment, it will be understood that the back section 81 pushes the protective door 25 out of the away along the dovetail slide guides 87, 89 in the back of the camera housing 20 from the closed position over the elongated opening 63 or the array 65 of openings to the position shown.

Also during attachment, the spring-loaded terminal pins (not shown) of the connector block 74 extending from the inside surface of the end section 85 bear against the pads 65 or into female receptacles. A connector slot array 79 in the end of camera housing 20 receives connector tabs (not shown) extending from the interior surface of the end section 85 to stabilize the attachment of the module 80 to the camera housing 22. In both of the variations of FIGS. 6 and 7, the attachment of the module 80 to the camera housing 20 may be effected in a variety of other ways readily apparent to those of skill in the art.

Once the attachment is made, the plunger mechanism 67 (FIG. 3) may be actuated to move the magnetic record/reproduce head(s) 60 into position for recording or reproducing information as described above and to retract the head 60 on after its use is completed. Alternatively, the head 60 may be manually advanced from and retracted back into the back of the back section 81.

After use of the record/reproduce module 80 is concluded, the module 80 may be removed by retracting the head 60 and sliding the module 80 off the back of the camera housing. The protective door 25 can be returned to the closed position manually or by internal spring action, if the door 25 is spring loaded and biased to the closed position.

As mentioned above, magnetic recording in photographic still camera involves unique problems. Film advance occurs in a short period of time with a limited amount of motion and does not allow the steady conditions normally associated with magnetic recording to be achieved. In view of these problems, the read/write circuit 96 preferably utilizes the encoding and decoding techniques disclosed in the above-referenced '419 patent.

In addition, in both embodiments, the magnetic recording head is preferably positioned to penetrate the film plane and to wrap the film strip around the magnetic head, the magnetic head having a curved profile in the cross film direction for ensuring compliance of the cross-curvature of the film strip with the elongated magnetic head in the manner described in the above-referenced '(Docket 69,995) application.

While the invention has been shown and described with reference to preferred embodiments thereof, it will be apparent that various changes may be made without departing from the scope of the invention as defined by the appended claims.

PARTS LIST FOR FIGS. 1–7 filmstrip 10
imperforate edge regions 10a
intermediate regions 10b
base 11
camera 12 photo-chemical layers 13
virtually transparent magnetic layer 15
anti-static and lubricating layer 17
backing plate 18
perforations 19
camera housing 20
camera slide connector 21
camera frame 22
cartridge loading chamber 24
slidable protective door 25
exposure gate opening 26
camera taking lens 28
film cartridge 30
cartridge spool 31
film take-up chamber 32
take-up spool 34
filmstrip advance/rewind system 36
bi-directional motor drive circuit 38
camera electro-mechanical control system 40
filmstrip advance/rewind transmission 42
filmstrip advance/rewind motor 44
microcomputer 46
AF/AE control system 48
frame counter 50
timer 52
metering switch 54
signal line 58
magnetic recording head 60
head support plate 62
elongated camera housing opening 63
opaque flexible web 64
camera housing opening array 65
head mounting cavity 66
head advance/retraction plunger mechanism 67
camera I/O ports 68
camera sensors 70
camera controls 72
terminal connector block 74
terminal pads 75
camera I/O bus 76
spring loaded connector pins 77
LCD display 78
connector slot array 79
record/reproduce module 80
back section 81
module housing 82
module slide connector 83
module I/O port 84
end section 85
module microprocessor 86
mating dovetail slide guides 87, 89
RAM 88
ROM 90
battery power supply 92
information input source 94
read/write electronics 96
sync circuit 98
outermost tracks C0-C3
innermost tracks F00-F29

We claim:

1. A system for recording or reproducing information in a magnetic layer on a photographic film strip comprising:

a still camera having means for receiving and transporting an elongated film strip having said magnetic layer deposited on the film surface, means for exposing image frames of the film strip, and a magnetic record head aligned with said magnetic layer of the filmstrip transported by the film strip receiving and transporting means; and a detachable, record module for attachment to said camera including power supply means, means for recording information in the magnetic layer of the film strip in relation to the exposure of image frames of the film strip, said information recording means including means for providing operating power to said magnetic record head from said power supply means, means for supplying control signals to said magnetic record head defining the recording format and content, and means for synchronizing the recording of information to the transport of the film strip by said film strip receiving and transport means of said camera.

2. The system of claim 1 wherein: said camera further comprises:

means for mounting said magnetic record head with respect to said magnetic layer on said film strip transported by said receiving and transporting means; and camera input/output means electrically connected to said magnetic record head; and said detachable record module further comprises:

module input/output means coupled to said information recording means for making electrical connection with said camera input/output means for providing recording signals to said magnetic record head.

3. A system for recording or reproducing information in a magnetic layer on a photographic film strip comprising:

a still camera including means for receiving and transporting an elongated film strip having said magnetic layer deposited on the film surface, means for exposing image frames of the film strip, and a magnetic head aperture for receiving a magnetic record head in alignment with a film transport path provided by the film strip receiving and transport means; and a detachable, record module for attachment to said camera including a magnetic record head aligned to be received within said magnetic head aperture and operatively positioned with respect to the magnetic layer of the filmstrip transported by the film strip receiving and transporting means, a magnetic recording power supply, information recording means powered by said magnetic recording power supply for recording information in said magnetic layer utilizing head in relation to the exposure of image frames of the film strip, said information recording means including means for providing operating power to said magnetic record head, means for supplying control signals defining the record format and content to said magnetic record head, and means for synchronizing the recording of information to the transport of the film strip by said film strip receiving and transport means of said camera.

4. The system of claim 3 wherein: said camera further comprises:

a separate removable cover overlying and protecting said magnetic record head aperture during use of said camera with said record module detached; and said detachable record module further comprises:

means for retracting said removable cover and positioning said magnetic record head in said magnetic aperture upon attachment of said record module to said camera.

5. The system of claim 3 wherein:

said magnetic record head comprises an elongated multi-head array; and said magnetic record head aperture is formed as a single elongated opening in said camera to receive the full length of said multi-head array and align it in the cross-film direction to extend across the film strip magnetic layer.

6. The system of claim 3 wherein:

said magnetic record head comprises and elongated multi-head array; and said magnetic record head aperture is a linear array of a plurality of discrete openings corresponding in number and shape to the number and shape of the discrete magnetic record head elements of the linear multi-head array for receiving each discrete magnetic record head element of the multi-head array.

7. The system of any one of the claims 1 and 3–9 wherein said means for providing control signals defining the recording format and content within said detachable module comprises means for recording analog information in at least one magnetic recording track of said magnetic layer of said film strip.

8. The system of any one of the claims 1 and 3–9 wherein said means for providing control signals defining the recording format and content within said detachable module comprises means for recording digital information in at least one magnetic recording track of said magnetic layer of said film strip.

9. The system of claim 3 wherein: said camera further comprises:

a light tight, flexible opaque film covering the magnetic record head aperture for preventing exposure of the film strip by stray light; and said magnetic record head is aligned to be received within said magnetic record head aperture and operatively positioned with respect to said opaque flexible film and said magnetic layer of the filmstrip transported by the film strip receiving and transporting means to effect magnetic recording in said magnetic layer through said opaque flexible film upon attachment of said record module to said camera.

10. The system of claim 9 wherein: said camera further comprises:

a separate removable cover overlying and protecting said magnetic record head aperture during use of said camera with said record module detached; and said detachable record module further comprises:

means for retracting said removable cover and positioning said magnetic record head in said magnetic aperture in contact with said opaque film upon attachment of said record module to said camera.

11. A system for recording information in a magnetic layer on a photographic film strip comprising:

in a camera:

a camera body defining a light tight outer enclosure having a magnetic head aperture formed therein;

means for guiding the film strip in a film transport path extending from a film strip supply through an exposure gate and to a film strip takeup and past said magnetic head aperture aligned with said magnetic layer on the film strip;

exposure control means responsive to user input signals for initiating and controlling the exposure of image frames in said exposure gate;

means for advancing the film strip past said magnetic head aperture between exposures of film strip image frames and providing film strip advance synchronization signals; and camera input/output terminal means coupled to said film strip advancing means for providing film advance synchronizing signals; and in a detachable record module adapted to be attached to said camera body:

a magnetic head;

a module housing adapted to be attached to said camera body in a predetermined attachment position for supporting said magnetic head for insertion into said magnetic head aperture of said camera body upon attachment of said module housing to said camera housing;

module input/output terminals for making mating contact with said camera input/output terminals on attachment of said module housing with said camera body;

record means coupled to the module input/output terminals for establishing the record format and providing record signals to said magnetic head during record time intervals;

synchronizing means for synchronizing the record time intervals to the film advance control signals provided by the film strip advancing means to said record means; and power supply means for powering said record means to provide said record signals.

12. The system of claim 11 wherein: said camera further comprises:

a separate removable cover supported by said camera body overlying and protecting said magnetic head aperture during use of said camera with said record module detached; and said detachable record module further comprises:

means for retracting said removable cover and positioning said magnetic head in said magnetic aperture upon attachment of said record module to said camera body.

13. The system of claim 11 wherein:

said magnetic head comprises an elongated multi-head array; and said magnetic head aperture is formed as a single elongated opening in said camera body to receive the full length of said multi-head array and align it in the cross-film direction to extend across the film strip magnetic layer.

14. The system of claim 11 wherein:

said magnetic head comprises and elongated multi-head array; and said magnetic head aperture is a linear array of a plurality of discrete openings in said camera body corresponding in number and shape to the number and shape of the discrete magnetic head elements of the linear multi-head array for receiving each discrete magnetic head element of the multi-head array.

15. The system of claim 11 wherein: said camera further comprises:

a light tight, flexible opaque film covering the magnetic head aperture for preventing exposure of the film strip by stray light while allowing magnetic recording in said magnetic layer through said opaque flexible film upon attachment of said record module to said camera body.

16. The system of claim 15 wherein: said camera further comprises:

a separate removable cover supported by said camera body overlying and protecting said magnetic head aperture and opaque film during use of said camera with said record module detached; and said detachable record module further comprises:

means for retracting said removable cover and positioning said magnetic head in said magnetic aperture in contact with said opaque film upon attachment of said record module to said camera body.

17. A system for recording information in a magnetic layer on a photographic film strip comprising: in a camera:

a camera body defining a light tight outer enclosure;

a magnetic head supported by said camera body;

means for guiding the film strip in a film transport path extending from a film strip supply through an exposure gate and to a film strip takeup and past said magnetic head aligned with said guiding means for contacting the magnetic layer on the film strip for recording information therein;

exposure control means responsive to user input signals for initiating and controlling the exposure of image frames in said exposure gate;

means for advancing the film strip past said magnetic head between exposures of film strip image frames and providing a film strip advance synchronizing signal; and camera input/output terminal means coupled to said magnetic head for transmitting recording signals to said magnetic head and coupled to said film strip advancing means for receiving film strip advance synchronizing signals; and in a detachable record module adapted to be attached to said camera:

a module housing adapted to make attachment with said camera body;

module input/output terminals for making mating contact with said camera input/output terminals on attachment of said module housing with said camera body;

record means coupled to said module input/output terminals for establishing the record format and providing record signals to said magnetic head within said camera body during record time intervals;

synchronizing means for synchronizing the record time intervals to the film strip advance synchronizing signals provided to the record means; and power supply means for powering said record means.

* * * * *

UNITED STATES PATENT AND TRADEMARK OFFICE
CERTIFICATE OF CORRECTION

PATENT NO. : 5,555,252
DATED : September 10, 1996
INVENTOR(S) : George W. Brock, et al It is certified that error appears in the above-indentified patent and that said Letters Patent is hereby corrected as shown below:

Col. 12, line 44          after "utilizing" insert --said magnetic record--

Col. 12, line 61          after "aperture" insert --in contact with said opaque film--

Signed and Sealed this

Twenty-first Day of October 1997

Attest:

BRUCE LEHMAN

*Attesting Officer*        Commissioner of Patents and Trademarks